(12) United States Patent
Schneider et al.

(10) Patent No.: US 8,567,687 B2
(45) Date of Patent: Oct. 29, 2013

(54) VEHICLE HEATING AND/OR AIR-CONDITIONING SYSTEM WITH AN AUTOMATIC HEATING AND AIR-CONDITIONING FUNCTION

(75) Inventors: Michael Schneider, Reichertshausen (DE); Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 362 days.

(21) Appl. No.: 12/973,006

(22) Filed: Dec. 20, 2010

(65) Prior Publication Data

US 2011/0088887 A1    Apr. 21, 2011

Related U.S. Application Data

(63) Continuation of application No. PCT/EP2009/004089, filed on Jun. 6, 2009.

(30) Foreign Application Priority Data

Jul. 4, 2008 (DE) .......................... 10 2008 031 712

(51) Int. Cl.
*G05D 23/00* (2006.01)
(52) U.S. Cl.
USPC .............. 236/1 C; 236/49.3; 236/94; 165/204
(58) Field of Classification Search
USPC ....... 236/1 C, 49.3, 94; 62/126, 161; 165/204
See application file for complete search history.

(56) References Cited

U.S. PATENT DOCUMENTS

| 5,230,467 A | 7/1993 | Kubsch et al. |
| 5,813,600 A * | 9/1998 | Straub .......................... 236/49.3 |
| 5,931,378 A * | 8/1999 | Schramm ........................ 236/94 |

(Continued)

FOREIGN PATENT DOCUMENTS

| DE | 40 41 193 A1 | 7/1992 |
| DE | 196 36 210 C1 | 7/1997 |

(Continued)

OTHER PUBLICATIONS

International Search Report dated Jan. 25, 2010 with English translation (ten (10) pages).

(Continued)

*Primary Examiner* — Marc Norman
(74) *Attorney, Agent, or Firm* — Crowell & Moring LLP

(57) ABSTRACT

A vehicle heating and/or air-conditioning system has an automatic heating and air-conditioning function. In a manual control mode, corresponding to an air quantity settable by the user with a first setting device and a desired interior temperature settable by a second setting device, a manual control of the actual interior temperature and the air quantity takes place. In an automatic-function control mode, corresponding to the desired interior temperature settable by the user and a selected air-conditioning style, an automatic-function control of the actual interior temperature takes place by controlling fans and air distribution flaps corresponding to the selected air-conditioning style. A characteristic fan curve and/or a characteristic air distribution curve is assigned to each air-conditioning style. A display unit, in which at least the air quantity manually selected by the user in the manual mode, and the air-conditioning style selected in the automatic mode uses identical illuminated symbols as its display.

11 Claims, 1 Drawing Sheet

(56) References Cited

U.S. PATENT DOCUMENTS

| | | | |
|---|---|---|---|
| 6,744,374 B1 * | 6/2004 | Kuenzner | 340/815.78 |
| 2004/0154320 A1 | 8/2004 | Bogner et al. | |
| 2006/0163045 A1 | 7/2006 | Kikuya | |
| 2007/0137850 A1 | 6/2007 | Straub | |

FOREIGN PATENT DOCUMENTS

| | | |
|---|---|---|
| DE | 199 41 948 A1 | 3/2001 |
| DE | 199 58 845 A1 | 6/2001 |
| DE | 103 24 571 B3 | 5/2004 |
| DE | 102 54 112 A1 | 6/2004 |
| DE | 20 2006 003 543 U1 | 7/2006 |
| DE | 10 2005 010 703 A1 | 9/2006 |
| EP | 1 422 082 A2 | 5/2004 |
| GB | 2 339 560 A | 2/2000 |
| JP | 1-114508 A | 5/1989 |
| JP | 4-306119 A | 10/1992 |
| JP | 11-42928 A | 2/1999 |
| JP | 2007-320521 A | 12/2007 |
| WO | WO 02/078988 A1 | 10/2002 |

OTHER PUBLICATIONS

German Search Report dated Mar. 18, 2009 with Parital English translation (nine (9) pages).
German-language Office Action dated Apr. 23, 2013 including English-language translation (Ten (10) pages).

* cited by examiner

US 8,567,687 B2

VEHICLE HEATING AND/OR AIR-CONDITIONING SYSTEM WITH AN AUTOMATIC HEATING AND AIR-CONDITIONING FUNCTION

CROSS-REFERENCE TO RELATED APPLICATIONS

This application is a continuation of PCT International Application No. PCT/EP2009/004089, filed Jun. 6, 2009, which claims priority under 35 U.S.C. §119 from German Patent Application No. DE 10 2008 031 712.8, filed Jul. 4, 2008, the entire disclosures of which are herein expressly incorporated by reference.

BACKGROUND AND SUMMARY OF THE INVENTION

The invention relates to a vehicle heating and/or air-conditioning system with an automatic heating and air-conditioning function.

Currently, many motor vehicles are known which have a vehicle heating and/or air-conditioning system with an automatic heating and air-conditioning function wherein the automatic air-conditioning system function is activated by operating an automatic-function key. In this operating state of the air-conditioning system, the entire air-conditioning actuator system, such as the fan and the air distribution flaps, is automatically controlled. The controlling of the actuator system for setting a desired interior temperature preset by the user takes place as a function of a fixedly stored automatic-function program or "air-conditioning style". In the manual control mode, a manual control of the temperature and air quantity takes place as a function of the driver's defaults.

From German Patent Document DE 102 54 112 A1, a so-called "automatic four-zone air-conditioning function" is known for a left upper, left lower, right upper and right lower interior area. An operating element is assigned to each of these four areas, by which operating element a thermal output desired for this area can be selected without leaving the automatic-function mode. In addition, the total quantity of air to be fed into the vehicle interior can be preselected by an additional operating element. As a function of the selected total quantity of air and the selected thermal output, the automatic air-conditioning function controls the outflow temperature of the air as well as the distribution of the air quantity separately for each area by controlling the air flaps at the individual air outlets. For reasons of simplicity, it may be provided that the additional operating element for selecting the desired total air quantity has only a few operating positions (weak—medium—strong); i.e., each position of the operating element activates an air-conditioning style corresponding to the desired total air quantity.

Finally, German Patent Document DE 103 24 571 B3 discloses a vehicle heating and/or air-conditioning system with an automatic heating and air-conditioning function, wherein, corresponding to a presettable desired interior temperature, an automatic control of the actual interior temperature takes place by the automatic control of a fan and of the air distribution flaps. The control takes place as a function of predefined characteristic automatic-function curves, in which case a characteristic automatic-function curve can be selected by the operation of an operating element provided for this purpose. In this case, the different characteristic automatic-function curves are adapted to the user's individual sensitivity to drafts.

In the case of the above-mentioned vehicle heating and/or air-conditioning system, when activating the automatic-function program by use of an operating element, the user can select the desired characteristic automatic-function curve or an air-conditioning style by way of an operating element without leaving the automatic-function program. After the selection of a characteristic curve, an automatic control of the air quantity and of the air distribution flaps corresponding to the selected characteristic curve takes place within the scope of the automatic-function control to the desired interior temperature; i.e., a different controlling of the air quantity and of the air distribution takes place which, in each case, is adapted to the user's needs with respect to his draft sensitivity. It is not disclosed whether and how the characteristic curve desired by the user within the scope of the automatic-function control, which corresponds to his sensitivity to drafts, is displayed. It is also not disclosed how the characteristic curve can be selected.

It is an object of the invention to improve upon a heating and/or air-conditioning system with an automatic heating and air-conditioning function with respect to the selection and display of an air-conditioning style or of the pertaining characteristic curve when the automatic-function control is activated.

This and other objects are achieved by a vehicle heating and/or air-conditioning system having an automatic heating and air-conditioning function which can be operated in a manual control mode or an automatic-function control mode. In the manual control mode, a manual control of the actual interior temperature and the air quantity is carried out corresponding to an air quantity selected by the user by way of a first setting device for the manual selecting of a desired air quantity from a given number of defined air quantities and a set interior temperature selected by way of a second setting device for selecting a desired set interior temperature. In the automatic-function control mode, which can be activated by operating an automatic-function operating element, corresponding to the set interior temperature predefined by the user and a selected air-conditioning style, an automatic-function control of the actual interior temperature takes place by the automatic control of one or more fans and of air distribution flaps corresponding to the selected air-conditioning style. An individual characteristic fan curve and/or a characteristic air distribution curve is assigned to each air-conditioning style, corresponding to which the automatic-function control will then take place; i.e., by selecting a certain air-conditioning style, the user can adapt, for example, the level of the quantity of air corresponding to his needs and wishes.

In accordance with the invention, the selection of an air-conditioning style in the automatic-function control mode also takes place by way of the first setting device by which the selection of the desired air quantity takes place in the manual control mode. An additional operating element can thereby be saved. Furthermore, the selection of an air-conditioning style during the automatic-function control by way of the setting device for setting the air quantity in the manual control mode appears to be particularly suitable because, also in the automatic-function control mode of the air-conditioning system, the user will intuitively push the first setting device, thus the fan key, when he is exposed to the problem of excessive draft. Thus, when he supposedly controls the fan downward, he really sets a softer air-conditioning style and will also immediately feel (and hear) that the right thing has happened: that the draft is reduced. However, in the background, the automatic air-conditioning function has adapted not only the characteristic fan curve but also the air distribution.

In another aspect of the invention, a display unit is provided in the vehicle heating and/or air-conditioning system in which, in the manual control mode, at least the air quantity manually selected by the driver and, in the automatic-function control mode, the air-conditioning style selected by the driver can be displayed. The advantage that the display of the selected air-conditioning style also takes place by way of the display of the air quantity or fan stage selected in the manual control mode, analogous to the first aspect of the invention when the air quantity is changed, the driver is accustomed to having this displayed to him by way of a certain display. By using the same display for the representation of the selected air quantity and of the selected air-conditioning style, the driver does not have to change his habits and can utilize this one display as an information source for the actual air quantity or the actual air-conditioning style for both types of control mode.

Advantageously, in the manual control mode, at least the air quantity manually selected by the user according to a first type of display, and, in the automatic-function control mode, the air-conditioning style selected by the user according to a second type of display can be displayed in the same display unit. As a result, the driver will immediately see by means of the display whether he is in the manual control mode or in the automatic-function control mode.

The air-conditioning style selected by the user in the automatic-function control mode and the air quantity selected by the user in the manual control mode can advantageously be displayed by use of identical illuminated symbols. No additional costs are therefore incurred for the manufacturing of the display unit.

In the first type of display, a certain number of activatable illuminated symbols is advantageously assigned to each defined air quantity, which number becomes higher as the air quantity increases. A corresponding number of illuminated symbols will then be activated as a function of the air quantity manually selected by the user. Thus, when the vehicle heating and/or air-conditioning system is not in an automatic-function control but in the manual control mode, a number of illuminated symbols corresponding to the manually selected air quantity will be activated.

In contrast to the above, although the identical illuminated symbols can be activated in the second type of display, when the automatic-function control is active and an air-conditioning style is selected by the user, in this type of display, precisely one illuminated symbol is assigned to each defined air-conditioning style. As a function of the air-conditioning style manually selected by the user, exactly only one of the illuminated symbols will then be activated.

Advantageously, the selection of an air-conditioning style in the automatic-function control mode also takes place by way of the first setting device by which the selection of the desired air quantity takes place in the manual control mode. As a result, an additional operating element can be saved. Furthermore, the selection of an air-conditioning style during the automatic-function control by way of the setting device for setting the air quantity in the manual control mode appears intuitive because this setting device is not needed in the automatic-function control mode. In addition, the selection of the air-conditioning style indirectly is a selection of the air quantity, so that the assignment of the setting device for setting an air quantity or a fan level is similar.

Other objects, advantages and novel features of the present invention will become apparent from the following detailed description of one or more preferred embodiments when considered in conjunction with the accompanying drawings.

DETAILED DESCRIPTION OF THE DRAWING

Figure 1:
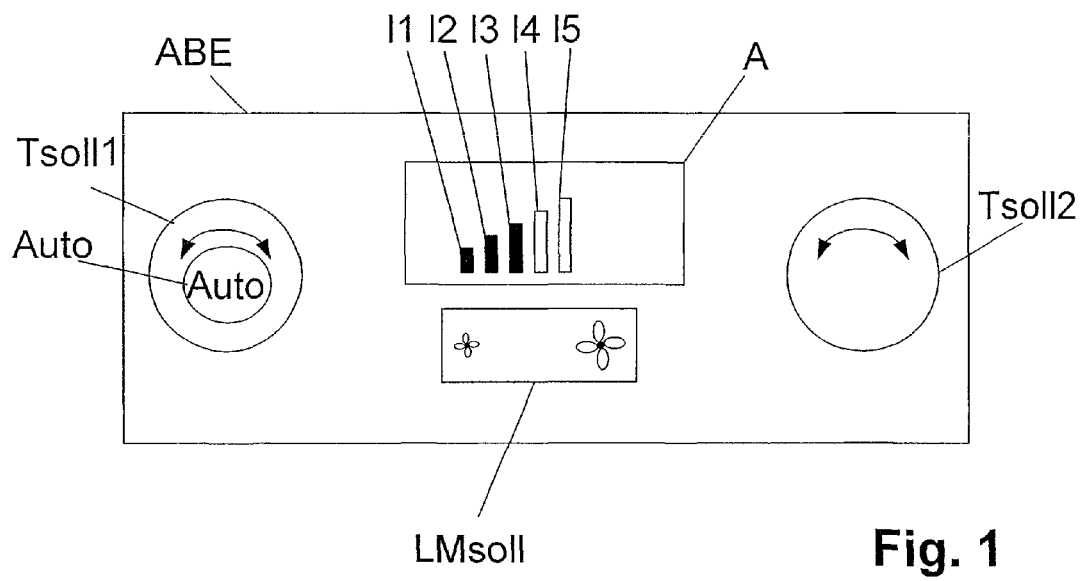
FIG. 1 is a view of a display operating unit of a vehicle heating and/or air-conditioning system having a display unit in which the selected air quantity is displayed in a first type of display.
Figure 2:
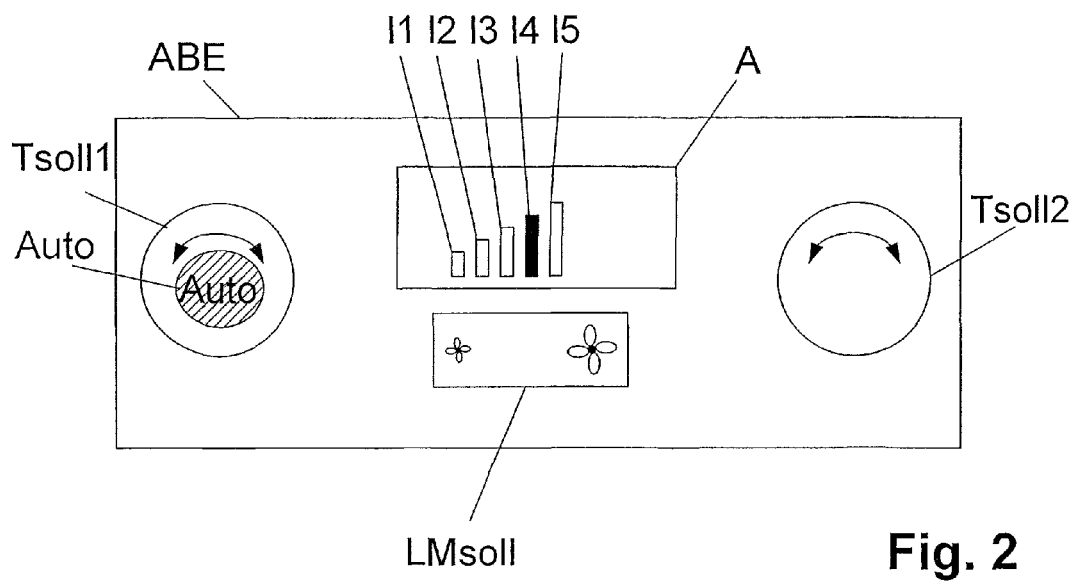
FIG. 2 is a view of the display operating unit illustrated in FIG. 1 in which the selected air-conditioning style is displayed in a second type of display.

FIGS. 1 and 2 both show a display operating unit ABE of a vehicle heating and/or air-conditioning system as described above, which is not illustrated in further detail. The display operating unit ABE includes a first setting device LMsoll for selecting a desired air quantity from a given number of defined air quantities and for selecting an air-conditioning style from a given number of defined air-conditioning styles. In this example, the user can choose from five different air quantities and air-conditioning styles. Furthermore, the display operating unit ABE includes a second setting device consisting of a first thermostat Tsoll1 for the driver side and a second thermostat Tsoll2 for the front passenger side of the vehicle. By use of these thermostats Tsoll1 and Tsoll2, the user can select a desired set interior temperature for the driver side and for the front passenger side by, for example, rotating the knob as shown. Within the scope of the "manual" control (i.e., an automatic-function control is not active), the desired set temperature and the desired air quantity are adjusted for both areas.

The display operating unit ABE further includes an automatic-function operating element Auto which, for example, is integrated in the first thermostat Tsoll1 and, when operated (e.g., by pushing of the thermostat), corresponding to an air-conditioning style automatically predefined in the background or an air-conditioning style manually selected by the driver and the desired interior temperature, an automatic-function control of the actual interior temperature takes place by the automatic controlling of one or more fans and of air distribution flaps.

Finally, the display operating unit ABE also includes a display unit A in which at least the manually selected air quantity during the manual control mode, and the selected air-conditioning style during the automatic-function control mode can be displayed. Corresponding to the number of the defined selectable air quantities, five illuminated symbols I1-I5 are displayed in the display unit A in the form of rectangles, whose size increases from the left to the right as shown.

FIG. 1 now illustrates a first type of display of the manually selected air quantity which appears when the automatic-function control is not active and, as a result, a manual control of the air quantity to the manually selected air quantity takes place. In this first type of display, as a function of the air quantity manually selected by the user, a corresponding number of illuminated symbols is activated; i.e., a defined number of illuminated symbols is assigned to each of the defined selectable air quantities, which illuminated symbol is activated, for example, illuminated. In this example, three of the five illuminated symbols are active, i.e., the user has selected the third of the five defined air quantities to be selected.

In contrast to the above, in FIG. 2, the vehicle heating and/or air-conditioning system is in an automatic-function control mode, which is indicated here by the cross-hatching on the automatic-function operating element. In this second type of display, as a function of the air-conditioning style manually selected by the user, by which a characteristic fan curve and a characteristic air distribution curve corresponding to the user's needs can be selected, exactly one of the illuminated symbols I1-I5 will be activated, specifically the illuminated symbol which, in the case of the first type of display, would be additionally activated when switching from a lower air quantity to the next higher air quantity. In this example, the fourth illuminated symbol I4 from the left is active; i.e., the user has selected the fourth of the five defined air-conditioning styles to be selected. The identification of the active automatic-function control by the automatic-function operating element (cross-hatched area) can therefore basically be eliminated in the case of such a vehicle heating and/or air-conditioning system because, as a result of the second type of display of the selected air quantity, the driver is informed that the automatic-function control is active in the case of the vehicle heating and/or air-conditioning system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle heating and/or air-conditioning system has an automatic heating and air-conditioning function with a manual control mode and an automatic function control mode, the system comprising:
   a first setting device operatively configured for a user to set an air quantity from a given number of defined air quantities;
   a second setting device operatively configured for a user to set a desired interior temperature;
   wherein a manual control of an actual interior temperature and air quantity occurs in the manual control mode in accordance with the user's settings;
   wherein an automatic-function control of the actual interior temperature occurs in the automatic-function control mode in accordance with the desired interior temperature settable by the user and a selected air-conditioning style from a given number of air-conditioning styles, the automatic-function control of the actual interior temperature taking place by controlling one or more fans and controlling one or more air distribution flaps in accordance with the selected air-conditioning style, at least one of a characteristic fan curve and characteristic air distribution curve by which the automatic-function control takes place being assigned to each air-conditioning style; and
   wherein a selection of the air-conditioning style in the automatic-function control mode occurs by way of the first setting device.

2. A method of operating a vehicle heating and/or air-conditioning system with an automatic heating and air-conditioning function, the system including a first setting device for setting an air quantity from a given number of defined air quantities and a second setting device for setting a desired interior temperature, the method comprising the acts of:
   in a manual control mode, controlling an actual interior temperature and the air quantity based upon user inputs via the first setting device and the second setting device; and
   in an automatic-function control mode, selecting an air-conditioning style with the first setting device, each air-conditioning style having at least one of a characteristic fan curve and characteristic air distribution curve by which automatic-function control occurs, and performing the automatic-function control of the actual interior temperature by controlling one or more fans and one or more air distribution flaps in accordance with the selected air-conditioning style.

3. A vehicle heating and/or air-conditioning system has an automatic heating and air-conditioning function with a manual control mode and an automatic function control mode, the system comprising:
   a first setting device operatively configured for a user to set an air quantity from a given number of defined air quantities;
   a second setting device operatively configured for a user to set a desired interior temperature;
   wherein a manual control of an actual interior temperature and air quantity occurs in the manual control mode in accordance with the users settings;
   wherein an automatic-function control of the actual interior temperature occurs in the automatic-function control mode in accordance with the desired interior temperature settable by the user and a selected air-conditioning style from a given number of air-conditioning styles, the automatic-function control of the actual interior temperature taking place by controlling one or more fans and controlling one or more air distribution flaps in accordance with the selected air-conditioning style, at least one of a characteristic fan curve and characteristic air distribution curve by which the automatic-function control takes place being assigned to each air-conditioning style; and
   a display unit operatively configured for displaying at least the air quantity manually selected by the user in a manual control mode and the air-conditioning style selected by the user in the automatic-function control mode,
   wherein in the manual control mode, at least the air quantity manually selected by the user is displayable with a first type of display, and wherein in the automatic-function control mode, the air-conditioning style selected by the user is displayable with a second type of display;
   wherein the air-conditioning style selected by the user in the automatic-function control mode and the air quantity selected by the user in the manual control mode are displayable using identical illuminated symbols.

4. The vehicle heating and/or air-conditioning system according to claim 3, wherein the first type of display comprises an activatable number of illuminated symbols corresponding with a number of defined air quantities, a certain number of the illuminated symbols being assigned to each defined air quantity, wherein the number of illuminated symbols is greater as the air quantity to be selected increases; and
   wherein as a function of the air quantities manually selected by the user, a corresponding number of illuminated symbols are activatable.

5. The vehicle heating and/or air-conditioning system according to claim 4, wherein the second type of display assigns exactly one illuminated symbol from a given number of illuminated symbols to each defined air-conditioning style, the number of illuminated symbols corresponding to the number of defined air-conditioning styles; and wherein as a function of the air-conditioning style manually selected by the user, only the one illuminated symbol assigned to the selected air-conditioning style is activated.

6. The vehicle heating and/or air-conditioning system according to claim 3, wherein the second type of display assigns exactly one illuminated symbol from a given number of illuminated symbols to each defined air-conditioning style, the number of illuminated symbols corresponding to the number of defined air-conditioning styles; and wherein as a function of the air-conditioning style manually selected by the user, only the one illuminated symbol assigned to the selected air-conditioning style is activated.

7. A display method for a vehicle heating and/or air-conditioning system with an automatic heating and air-conditioning function having a manual control mode and an automatic-function control mode, the method comprising the acts of:

displaying an air quantity manually selectable by a user when in the manual control mode;

displaying an air-conditioning style selectable by the user when in an automatic-function control mode, the automatic-function control mode operating in accordance with a desired interior temperature settable by the user and a selected air-conditioning style from a given number of air-conditioning styles to control one or more fans and one or more air distribution flaps as a function of at least one of a characteristic fan curve and characteristic air distribution curve assigned to each air-conditioning style; and displaying the air-conditioning style selectable by the user when in the automatic-function control mode and the air quantity selectable by the user when in the manual control mode using identical illuminatable symbols.

8. The method according to claim 7, further comprising the acts of:

displaying the air quantity manually selectable by the user with a first display type; and displaying the air-conditioning style selectable by the user with a second display type.

9. The method according to claim 8, wherein the first display type comprises a number of illuminatable symbols identical with the number of definable air quantities; and wherein a defined number of the illuminatable symbols are assigned to each defined air quantity in accordance with the number of illuminatable symbols being greater as the selectable air quantity increases.

10. The method according to claim 9, further comprising the acts of:

assigning exactly one illuminatable symbol from a given number of illuminatable symbols to each defined air-conditioning style, the number of illuminatable symbols corresponding to the number of defined air-conditioning styles; and illuminating only the illuminatable symbol assigned to the air-conditioning style manually selected by a user.

11. The method according to claim 8, further comprising the acts of:

assigning exactly one illuminatable symbol from a given number of illuminatable symbols to each defined air-conditioning style, the number of illuminatable symbols corresponding to the number of defined air-conditioning styles; and illuminating only the illuminatable symbol assigned to the air-conditioning style manually selected by a user.

* * * * *